Sept. 17, 1940.  R. E. NELLES  2,215,427
WHEEL STOP FOR MONORAIL TRACKAGE
Filed Oct. 12, 1938
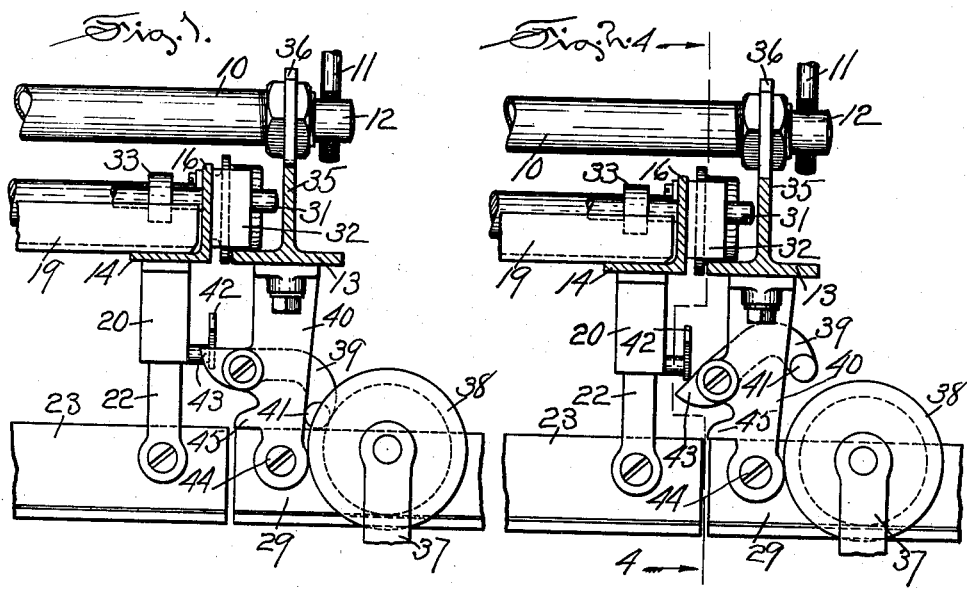
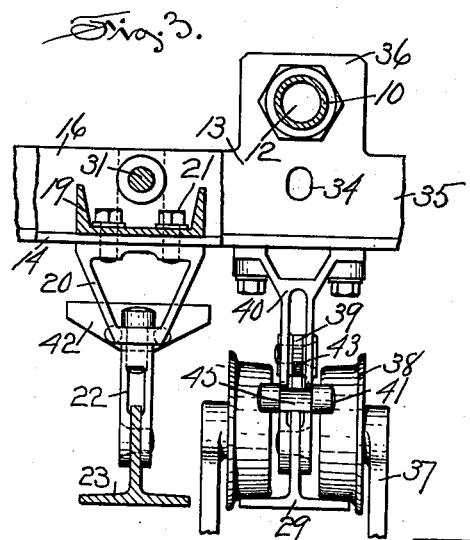
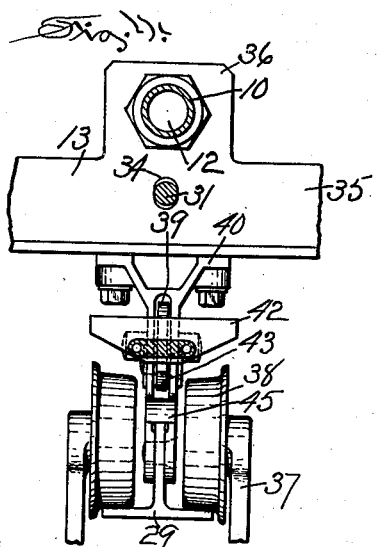
INVENTOR
Russell E. Nelles,
by Arthur B. Jenkins,
ATTORNEY Patented Sept. 17, 1940

2,215,427

UNITED STATES PATENT OFFICE 2,215,427

WHEEL STOP FOR MONORAIL TRACKAGE

Russell E. Nelles, South Orange, N. J., assignor to Union Manufacturing Company, New Britain, Conn., a corporation of Connecticut Application October 12, 1938, Serial No. 234,644

6 Claims. (Cl. 104—98)

My invention relates to the class of devices employed for stopping the movements of trolleys along monorail trackage, and particularly adjacent to switches, transfer bridges, etc., in such structures, and an object of my invention, among others, is the construction of a safety stop for such purpose that shall be simple in construction and positive and effective in its action; and a further and material object of the invention is the construction of a safety stop which will substantially confine the shock of wheel impact and consequent effects thereof to the rail on which the load is supported and thereby prevent serious injury to the overhead and supporting structure.

One form of a safety stop embodying my invention and in the construction and use of which the objects herein set out, as well as others, may be attained, is illustrated in the accompanying drawing in which—

Figure 1 is a view in elevation of a suspension system for one end of a spur track of a monorail system showing my improved safety stop applied thereto, a portion of a switch also being shown and the safety stop being in its operative position.

Figure 2 is a similar view but showing the safety stop in its inoperative position.

Figure 3 is a view looking at the structure of Figure 1 from the left.

Figure 4 is a view in section on a plane denoted by the dotted line 4—4 of Figure 2.

Figure 5 is a detail view of the lower part of the structure looking from the right in Fig. 1, but with the trolley wheels removed.

In the use of monorail structures for supporting carriers of loads commonly suspended from trolleys, stops are frequently employed to halt the carrier at a designated point. There is objection to the use of such a stop from the fact that the shock occasioned by the force of the blow against the stop is transmitted to the overhead suspension system, causing much vibration and frequently considerable damage to the system. It is a purpose of my present invention to so construct a stop for the purpose mentioned that the shock occasioned by the forceful stopping of the load will not be transmitted to the suspension system, but will be substantially absorbed by the rail on which the load is supported, the effect of such stopping not being appreciably apparent in the rest of the system. These stops are frequently employed to stop the movement of a carrier at the end of a rail in connection with which a switch for shifting the carrier from one track to another is employed, and I have, therefore, illustrated my improved safety stop in connection with such a switch, although it may be well employed in any case where it is desired to stop the movement of a trolley at any designated point.

In the accompanying drawing the numeral 10 denotes a supporting bar for the switch of a monorail system, only one side of said switch and its support being shown, this being sufficient for a full disclosure of my invention, it being understood that the opposite side is of duplicate construction. This bar is suspended at its opposite ends by supporting rods 11 attached to and depending from a beam or beams in any suitable manner. In the structure as shown herein the rods 11 are screw threaded into studs 12 secured within the ends of the bar 10 in any suitable manner. Main supporting members 13, preferably of inverted T-shape, of a stationary supporting frame for an inner or movable switch frame, are secured to and depend from opposite ends of the bar 10, the latter passing through the webs of the main supporting members and being fastened as by nuts secured to the bar on opposite sides of the webs, as shown in Figure 1 of the drawing.

An inner or movable switch frame is supported on the inner flanges of the members 13, this frame comprising supporting switch members 14, preferably of angular shape, and provided with any suitable means for effecting its movement along a flange of a member 13 in a manner common to such structures and which will be readily understood. A brace 19 preferably of channel shape extends between the supporting switch members 14 and is rigidly secured at its opposite ends to said members substantially at their lengthwise centers. Other parts of the inner or movable switch frame are omitted from the showing, such not being necessary for a full understanding of the invention.

Hangers 20 are secured to the under side of the members 14, as shown herein bolts passing through the brace 19 and flanges on the hangers being secured as by means of nuts 21. It will be understood that these hangers are oppositely arranged on the movable switch frame and each hanger has a fork 22 at its lower end to receive the web of a switch rail 23 or member extending across the frame for the travel of a trolley along such rail. A section of track 29 which may be a main or spur track is secured at its end to the stationary supporting frame.

Locking bolts 31, one only being shown, are mounted for reciprocating movement on the inner switch frame, the inner ends of the bolts passing through holes in the upright parts or stems 16 of the supporting switch members 14 of such frame and through blocks 32 secured to the outer sides of said stems, as shown in Figure 2 of the drawing. A stop 33 in the form of a collar is secured to the bolt 31 to limit its locking movement, as when its end is projected into an opening 34 in the web 35 of the main supporting member 13, it being noted that said web has an extension 36 through which the end of the supporting bar 10 projects, as shown in Figures 3 and 4 of the drawing. The bolts 31 are employed to lock the movable switch frame in position with rails including the rail 23 thereon in registry with the track 29 or with other tracks not shown, said bolt being operated in any ordinary manner common to structures of this type.

Only a portion of the trolley for supporting a suspended load is shown herein, this being sufficient for an understanding of my invention. Such trolley may consist of forked hangers 37 suspended from wheels 38 rotatably mounted in the branches of each fork, as shown in Figures 3 and 4 of the drawing. It will be obvious that a single hanger for supporting a load may be employed in some instances.

In order to stop movement of these trolleys at any point, and particularly adjacent the ends of a rail as 29 when the movable switch frame is not in position with a switch member thereon in registry with the rail along which the load may be moving, my improved stop mechanism is provided. This consists of a stop lever 39 mounted at the end of a rail, or otherwise as the case may be, as shown herein such lever being pivotally mounted in a hanger 40 secured to and depending from the under side of the member 13, as shown in Figures 3 and 4 of the drawing, said hanger being forked at its lower end to receive the web of the rail 29 for the support of said rail. Stop lugs 41 project from the opposite sides of one end of the lever in position to contact with wheels 38 in a hanger 37 when the lever is lowered, as shown in Figure 3 of the drawing, in which lowered position the lever will be whenever the switch frame is out of switching position. In order to raise the lever a cam actuator 42 is secured to the hanger 20 and to other similar hangers which may be employed. The under edge of said actuator is inclined so that when the movable switch frame approaches a position where a rail therein is nearly in registry with a rail on the main supporting frame, contact of an actuator with the nose 43 of a stop lever will begin to tilt such lever, and when the rails come into registering position the lugs 41 will be lifted in position to permit movement of the wheels 38 so that the trolley may pass on to a rail on the movable switch frame or from said frame to a rail on the main frame. The moment the switch frame is moved from such registering position the stop levers will be freed from the actuator 42 and will therefore be lowered into position to stop the movement of a trolley approaching the end of its rail on the main frame.

The stop lugs 41 when the lever is in its stopping position are located so near the horizontal diameter of the wheels 38 that the lever will not be cammed upwardly by the action of said wheels, the direction of rotation of the wheels in fact tending to hold the lever in its stopping position.

The locking bolts 31 may be operated in any well known manner common to structures of this type and an illustration and description of such operating means is, therefore, omitted herein.

A very important feature of my invention resides in the construction whereby when a trolley encounters the safety stop and comes to rest the force of the blow delivered against the safety stop will be transmitted to a very minimum degree to the suspension system and will be confined substantially to the rail 29 upon which the trolley is located. The lugs 41 receive and transmit the force of impact of the wheels 38 in stopping to the hanger 40 and by locating the lugs 41 at this time in close proximity to the pivot bolt 44 that secure the rails 29 to the hangers 40, when the levers 39 are in their stopping positions substantially the entire force of the blow is practically resisted by the pivot bolts 44 and is thereby transmitted to the rail 29, which is substantially rigid. In this way I practically remove all tendency of the hangers 40 to turn on the pivot bolts 44 and therefore substantially prevent movement of the suspension system which would be occasioned by any material movement of said hangers.

In order to further guard against the result just mentioned I provide the hangers 40 with lugs 45 projecting from the hangers and resting substantially in contact with the upper edges of the webs of the rails 29, as shown in Figures 1 and 2 of the drawing. This practically prevents all tendency of any pivotal movement of the hangers 40 contraclockwise on the pivots 44 independently of the rails 29 occasioned by contact of the wheels 38 with the stop lugs 41.

A particular feature of my improved safety stop is that which enables it to be made of a size small enough to be confined within the limited space available immediately above the stem of the main or spur track of monorail trackage, the width of such operating space, owing to the presence of electrification bars and equipment (not shown herein) being extremely limited and, therefore, not available for location of stop mechanism of any material size, being confined substantially to the thickness of the web of such trackage. This is apparent from the fact that the stop lugs 41 project at right angles to the track at such distance on either side of the lever that the ends of said lugs terminate within the flanges of the trolley wheels, as shown in Figure 3 of the drawing. This is permitted by use of the forked hanger 40 which enables the insertion of the stop lever 39 therein while the operating end of the lever, including the stop lugs 41, are at all times out of the way, said lugs, as hereinbefore noted, being confined to the space on the treads between the flanges of the wheels, which permits an extremely compact design in so far as dimensions are concerned, and which completely clears an electrification bar or equipment necessary for the operation of the system.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A stop for trolleys of monorail systems comprising main supporting members suspended by supporting rods and a hanger secured to and projecting downwardly from one of said main supporting members and a rail secured at a place to said hanger for supporting a wheel of said trolley, said stop including a lever pivotally mounted on the hanger and a lug carried by said lever to be located thereby in the path of movement of the tread of a trolley wheel and against the edge of said hanger in proximity to the place of support of said rail to obstruct the movement of said wheel.

2. A stop for trolleys of monorail systems comprising main supporting members suspended by supporting rods and a forked hanger secured to and projecting downwardly from one of said members together with a rail secured at a place to said hanger for supporting a wheel of such trolley, said stop including a pivotally mounted lever between the branches of said fork, and lugs projecting from opposite sides of said lever and carried thereby for location in the path of movement of the tread of a trolley wheel and against the edge of said hanger in proximity to the place of support of said rail to obstruct movement of said wheel.

3. A stop for trolleys of monorail systems comprising main supporting members suspended by supporting rods and a forked hanger secured to and projecting downwardly from each of said members together with a rail secured at a place to said hanger for supporting a wheel of said trolley, said stop including a lever pivotally mounted on said hanger, a lug carried by said lever to be located thereby in the path of movement of the tread of a trolley wheel and against the edge of said hanger in proximity to the place of support of said rail to obstruct movement of said wheel, a switch member included in said system, and means on said switch member to move said stop member into non-stop position.

4. A stop for trolleys of monorail systems comprising main supporting members suspended by supporting rods and a forked hanger secured to and projecting downwardly from one of said members together with a rail secured at a place to said hanger for supporting a wheel of said trolley, said stop including a lever pivotally mounted between the branches of said hanger, lugs projecting from opposite sides of one end of said lever to be carried thereby into the path of movement of the tread of a trolley wheel and against said hanger in proximity to the place of support of such rail to obstruct the movement of said wheel, said lever projecting through said hanger and having a nose at the end opposite said lugs, a switch member, and a cam on said switch member to engage said nose to lift the stop member into non-stop position.

5. A stop for trolleys of monorail systems comprising main supporting members suspended by supporting rods and a hanger secured to and projecting downwardly from one of said members together with a rail attached at a place to said hanger for supporting a wheel of such trolley, a lug projecting from said hanger into contact with the edge of said rail to resist pivotal movement of the hanger at its place of attachment to the rail, said stop including a lever pivotally mounted on the hanger and a lug carried by said lever to be located thereby in the path of movement of the tread of a trolley wheel and between said wheel and said hanger.

6. A stop for trolleys of monorail systems comprising main supporting members suspended by supporting rods and a hanger secured to and projecting downwardly from one of said members together with a rail attached at a place to said hanger for supporting a wheel of such trolley, a lug projecting from one side of said hanger into contact with the edge of said rail to restrain pivotal movement of the hanger at its place of connection with said rail, said stop including a lever pivotally mounted on said hanger in the path of movement of the tread of a trolley wheel and against the edge of said hanger substantially opposite the lug on said hanger and in proximity to the point of support of said rail to obstruct the movement of said wheel.

RUSSELL E. NELLES.